(12) United States Patent
Kwon

(10) Patent No.: US 11,269,495 B2
(45) Date of Patent: Mar. 8, 2022

(54) DISPLAY APPARATUS AND CONTROL METHOD THEREOF

(71) Applicant: SAMSUNG ELECTRONICS CO., LTD., Suwon-si (KR)

(72) Inventor: Oh-yun Kwon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/076,243

(22) Filed: Oct. 21, 2020

(65) Prior Publication Data

US 2021/0034204 A1 Feb. 4, 2021

Related U.S. Application Data

(63) Continuation of application No. 15/808,033, filed on Nov. 9, 2017, now Pat. No. 10,845,957.

(30) Foreign Application Priority Data

Jan. 13, 2017 (KR) .......................... 10-2017-0005781

(51) Int. Cl.
*G06F 17/00* (2019.01)
*G06F 3/0482* (2013.01)
(Continued)

(52) U.S. Cl.
CPC ........ *G06F 3/0482* (2013.01); *G06F 3/04847* (2013.01); *H04N 21/4312* (2013.01);
(Continued)

(58) Field of Classification Search
CPC .. G06F 16/313; G06F 3/04847; G06F 3/0482; H04N 21/47; H04N 21/485;
(Continued)

(56) References Cited

U.S. PATENT DOCUMENTS 6,121,968 A 9/2000 Arcuri
6,219,053 B1 4/2001 Tachibana
(Continued)

FOREIGN PATENT DOCUMENTS

CN 1936799 3/2007
CN 102567028 7/2012
(Continued)

OTHER PUBLICATIONS

Rejection Decision dated Nov. 11, 2020 in counterpart Chinese Patent Application No. 201711360586.2 and English-language translation.

(Continued)

*Primary Examiner* — Laurie A Ries
(74) *Attorney, Agent, or Firm* — Nixon & Vanderhye, P.C.

(57) ABSTRACT

A display apparatus is provided. The display apparatus includes a display, an input receiver comprising input receiving circuitry, and a controller. The input receiver receives an input, e.g., a user input. The controller displays a user interface (UI) including a plurality of menu items on the display, performs a function corresponding to a menu item selected based on the input from among the plurality of menu items, determines whether the function has been used based on a type of the function performed, and changes a configuration of the plurality of menu items based on the determination. With this, the display apparatus may provide menu items corresponding to frequently or more used functions to allow a user to easily access thereto, thereby improving user convenience.

16 Claims, 16 Drawing Sheets

(51) Int. Cl.
*H04N 21/485* (2011.01)
*H04N 21/47* (2011.01)
*G06F 3/04847* (2022.01)
*H04N 21/431* (2011.01)
*H04N 21/45* (2011.01)
*G06F 16/31* (2019.01)

(52) U.S. Cl.
CPC ........... *H04N 21/47* (2013.01); *H04N 21/485* (2013.01); *G06F 16/313* (2019.01); *H04N 21/4532* (2013.01)

(58) Field of Classification Search
CPC ............. H04N 21/4532; H04N 21/482; H04N 21/4858; H04N 21/4312; H04N 21/4318; H04N 21/4821; H04N 21/4825
See application file for complete search history.

(56) References Cited

U.S. PATENT DOCUMENTS

| | | | |
|---|---|---|---|
| 6,263,217 | B1 | 7/2001 | Park |
| 6,499,029 | B1 | 12/2002 | Kurapati |
| 6,847,387 | B2 | 1/2005 | Roth |
| 7,127,679 | B2 | 10/2006 | Cohen |
| 9,998,784 | B2* | 6/2018 | Yu ........................ H04N 21/818 |
| 2002/0080188 | A1 | 6/2002 | Somashekaraiah |
| 2004/0017376 | A1 | 1/2004 | Tagliabue |
| 2004/0100479 | A1 | 5/2004 | Nakano |
| 2005/0108865 | A1 | 5/2005 | Yabu |
| 2005/0223339 | A1* | 10/2005 | Lee .................... H04N 21/4312 715/825 |
| 2006/0064651 | A1 | 3/2006 | Ito |
| 2006/0248474 | A1* | 11/2006 | Kimotsuki ............ G06F 3/0482 715/810 |
| 2007/0075981 | A1* | 4/2007 | Hsieh ...................... G06F 3/038 345/173 |
| 2007/0130522 | A1 | 6/2007 | Mansell |
| 2009/0019396 | A1 | 1/2009 | McCarthy |
| 2009/0158167 | A1 | 6/2009 | Wang |
| 2010/0095227 | A1* | 4/2010 | Park ...................... G06F 3/0482 715/762 |
| 2010/0287468 | A1 | 11/2010 | Reifman |
| 2011/0047471 | A1 | 2/2011 | Lord |
| 2011/0231875 | A1 | 9/2011 | Lee |
| 2011/0252346 | A1 | 10/2011 | Chaudhri |
| 2011/0276396 | A1* | 11/2011 | Rathod ................. H04L 51/066 705/14.49 |
| 2012/0227000 | A1 | 9/2012 | McCoy |
| 2013/0016075 | A1 | 1/2013 | Kim et al. |
| 2013/0111403 | A1 | 5/2013 | Nakamura |
| 2014/0123063 | A1 | 5/2014 | Hwang et al. |
| 2014/0165006 | A1* | 6/2014 | Chaudhri .............. G06F 3/0487 715/835 |
| 2014/0304646 | A1* | 10/2014 | Rossmann ............ G06F 3/0482 715/790 |
| 2014/0317573 | A1 | 10/2014 | Hyeon |
| 2014/0325444 | A1 | 10/2014 | Garrison et al. |
| 2015/0012860 | A1 | 1/2015 | Cha |
| 2015/0067583 | A1 | 3/2015 | Kim et al. |
| 2015/0121271 | A1 | 4/2015 | Huang |
| 2015/0177919 | A1 | 6/2015 | Lee |
| 2015/0199083 | A1* | 7/2015 | Kuscher ................. G06F 3/0482 715/810 |
| 2015/0356501 | A1* | 12/2015 | Gorjestani ......... G06Q 10/0833 705/333 |
| 2016/0077686 | A1* | 3/2016 | Cosio ................. H04N 21/4821 715/825 |
| 2016/0264094 | A1 | 9/2016 | Suemune |
| 2016/0320928 | A1 | 11/2016 | Sato |
| 2017/0068400 | A1* | 3/2017 | Chiba ................... G06F 3/0482 |
| 2017/0092153 | A1 | 3/2017 | Horbal |

FOREIGN PATENT DOCUMENTS

| | | |
|---|---|---|
| CN | 103092486 | 5/2013 |
| CN | 103795948 | 5/2014 |
| CN | 104423834 | 3/2015 |
| CN | 104580679 | 4/2015 |
| EP | 1 067 453 | 1/2001 |
| JP | 2005-327143 | 11/2005 |
| JP | 2007-317223 | 12/2007 |
| JP | 2008-118346 | 5/2008 |
| KR | 1999-0046942 | 7/1999 |
| KR | 10-2002-0015753 | 3/2002 |
| KR | 10-2002-0053649 | 7/2002 |
| KR | 10-2004-0083797 | 10/2004 |
| KR | 2004-0107930 | 12/2004 |
| KR | 10-2008-0077798 | 8/2008 |
| WO | 2010/0116285 | 10/2010 |

OTHER PUBLICATIONS

Second Office Action dated Jul. 10, 2020 in counterpart Chinese Application No. 201711360586.2 and English-language translation.
First Office Action dated Dec. 11, 2019 in counterpart Chinese Application No. 201711360586.2 and English-language translation.
Search Report and Written Opinion dated May 29, 2018 in counterpart International Patent Application No. PCT/KR2017/012905_.
Extended Search Report dated Jun. 6, 2018 in counterpart European Patent Application No. 17209829.5.
Kwon, U.S. Appl. No. 15/808,033, filed Nov. 9, 2017.
Reexamination Notification dated Jul. 14, 2021 in CN Application No. 201711360586.2 and English-language translation.
Communication pursuant to Article 94(3) EPC dated Nov. 11, 2021 in EP Application No. 17209829.5.

* cited by examiner

FIG. 9
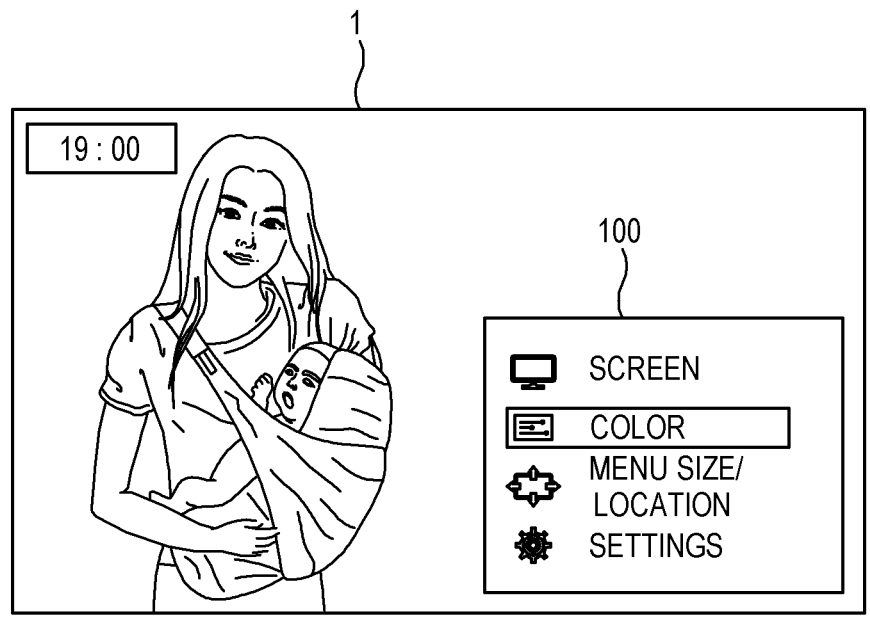
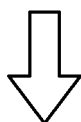
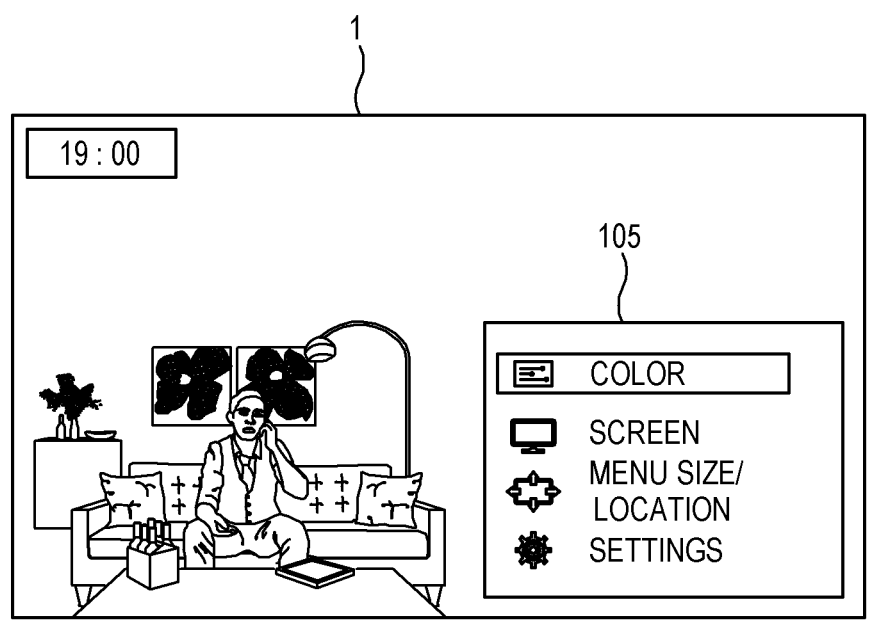

DISPLAY APPARATUS AND CONTROL METHOD THEREOF

CROSS-REFERENCE TO RELATED APPLICATIONS

This application is a continuation of U.S. application Ser. No. 15/808,033, filed Nov. 9, 2017, now U.S. Pat. No. 10,845,957, which is based on and claims priority under 35 U.S.C. § 119 to Korean Patent Application No. 10-2017-0005781, filed on Jan. 13, 2017 in the Korean Intellectual Property Office, the disclosure of which is incorporated by reference herein in its entirety.

BACKGROUND

Field

The present disclosure relates generally to a display apparatus and a control method thereof, and for example, to a display apparatus, which displays a plurality of menu items corresponding to functions providable by the display apparatus, and a control method thereof.

Description of Related Art

With technology developments and various user demands, functions for display apparatus are also being diversified. However, a user does not use all diversified functions for display apparatus, and mainly uses familiar functions according to use patterns. In an existing display apparatus, locations of menu items, which are selected by the user to use required functions, are fixed. Thus, if frequently used menu items are located on bottom or in lower layer, the user always requires several troublesome manipulations to perform functions corresponding thereto.

To address such a problem, according to a related art, there has been an attempt to separately provide the frequently used menu items to allow the user to easily select them, or allow the user to directly add the frequently used menu items into favorites menu, thereby resolving inconveniences.

However, such a related art does not take into account whether the user has actually used corresponding functions and there is inconvenience in that the user must manually select favorite menu items and add them into the favorites menu one by one.

SUMMARY

Example embodiments address at least the above problems and/or disadvantages and other disadvantages not described above.

The example embodiments may provide a display apparatus, which provides menu items corresponding to frequently or much used functions to allow a user to easily access the times, thereby improving use convenience, and a control method thereof.

According to an aspect of an example embodiment, a display apparatus is provided, the display apparatus including: a display; an input receiver comprising circuitry configured to receive an input; and a controller configured to display a user interface (UI) including a plurality of menu items on the display, to perform a function corresponding to a menu item selected based on the input from among the plurality of menu items, to determine whether the function has been used based on a performed type of the function, and to change a configuration of the plurality of menu items based on the determination. Accordingly, the display apparatus may provide menu items corresponding to frequently or much used functions to allow a user to easily access thereto, thereby improving use convenience.

The controller may be configured to change the configuration of the plurality of menu items by placing menu items corresponding to functions having higher degree of use at a higher location than other menu items.

The UI may include an upper layer comprising a plurality of parent menu items, and a lower layer comprising a plurality of child menu items corresponding to the plurality of parent menu items, respectively.

The controller may be configured to perform a function corresponding to a child menu item selected from among the plurality of child menu items, to determine whether the function has been used based on a performed type of the function, and to change the configuration of the plurality of menu items by changing a location of the plurality of parent menu items in the upper layer based on the determination.

The controller may be configured to perform a function corresponding to a child menu item selected from among the plurality of child menu items, to determine whether the function has been used based on a performed type of the function and change the configuration of the plurality of menu items by placing the selected child menu item in the upper layer based on the determination.

The controller may be configured to perform a function corresponding to a child menu item selected from among the plurality of child menu items, to determine whether the function has been used based on a performed type of the function and to change the configuration of the plurality of menu items by changing a location of the plurality of child menu items in the lower layer based on the determination.

The controller may be configured to determine whether the function has been used based on at least one of a time in which a setting value changed based on the performance of the function being maintained, a time, a number of times and a frequency in which the function is performed.

The controller may be configured to, in response to a setting value being changed based on the performance of the function and determining that the function has been used, to display a menu item to which the setting value is immediately applied.

The controller may be configured to, in response to determining that the function has been used with respect to a first content, to change a configuration of the plurality of menu items based on a degree to which the function is used with respect to the first content and to display the changed configuration on the display, when the first content or a second content related to the first content is provided.

The controller may be configured to determine that the first and the second contents are related to each other based on at least one of genres, titles, sources and broadcast channels of the first and the second contents.

According to an aspect of another example embodiment, a method of controlling a display apparatus is provided, including: receiving an input; displaying a user interface (UI) comprising a plurality of menu items; performing a function corresponding to a menu item selected according to the input from among the plurality of menu items; determining whether the function has been used based on a performed type of the function; and changing a configuration of the plurality of menu items based on the determination. Accordingly, the display apparatus may provide menu items corresponding to frequently or much used functions to allow a user to easily access thereto, thereby improving use convenience.

The changing may include changing the configuration of the plurality of menu items to place menu items corresponding to functions having higher degree of use at a higher location than other menu items.

The UI may include an upper layer comprising a plurality of parent menu items, and a lower layer comprising a plurality of child menu items corresponding to each of the plurality of parent menu items.

The changing may include performing a function corresponding to a child menu item selected from among the plurality of child menu items, determining whether the function has been used based on a performed type of the function, and changing a location of the plurality of parent menu items in the upper layer based on the determination.

The changing may include performing a function corresponding to a child menu item selected from among the plurality of child menu items, determining whether the function has been used based on a performed type of the function, and placing the selected child menu item in the upper layer based on the determination.

The changing may include performing a function corresponding to a child menu item selected from among the plurality of child menu items, determining whether the function has been used based on a performed type of the function, and changing a location of the plurality of child menu items in the lower layer based on the determination.

The determining may include determining whether the function has been used based on at least one of a time in which a setting value changed according to the performance of the function is maintained, a time, a number of times and a frequency in which the function is performed.

The method may further include in response to a setting value being changed according to the performance of the function and determining that the function has been used, displaying a menu item to which the setting value is immediately applied.

The method may further include, in response to determining that the function has been used with respect to a first content, changing a configuration of the plurality of menu items based on a degree to which the function is used with respect to the first content and display the changed configuration on the display, when the first content or a second content related to the first content is provided.

The changing and displaying the configuration of the plurality of menu items may include determining that the first and the second contents are related to each other based on at least one of genres, titles, sources and broadcast channels of the first and the second contents.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 9 is a diagram illustrating an example of determining whether the user has used a function with respect to a specific time, according to an example embodiment;

DETAILED DESCRIPTION

Figure 1:
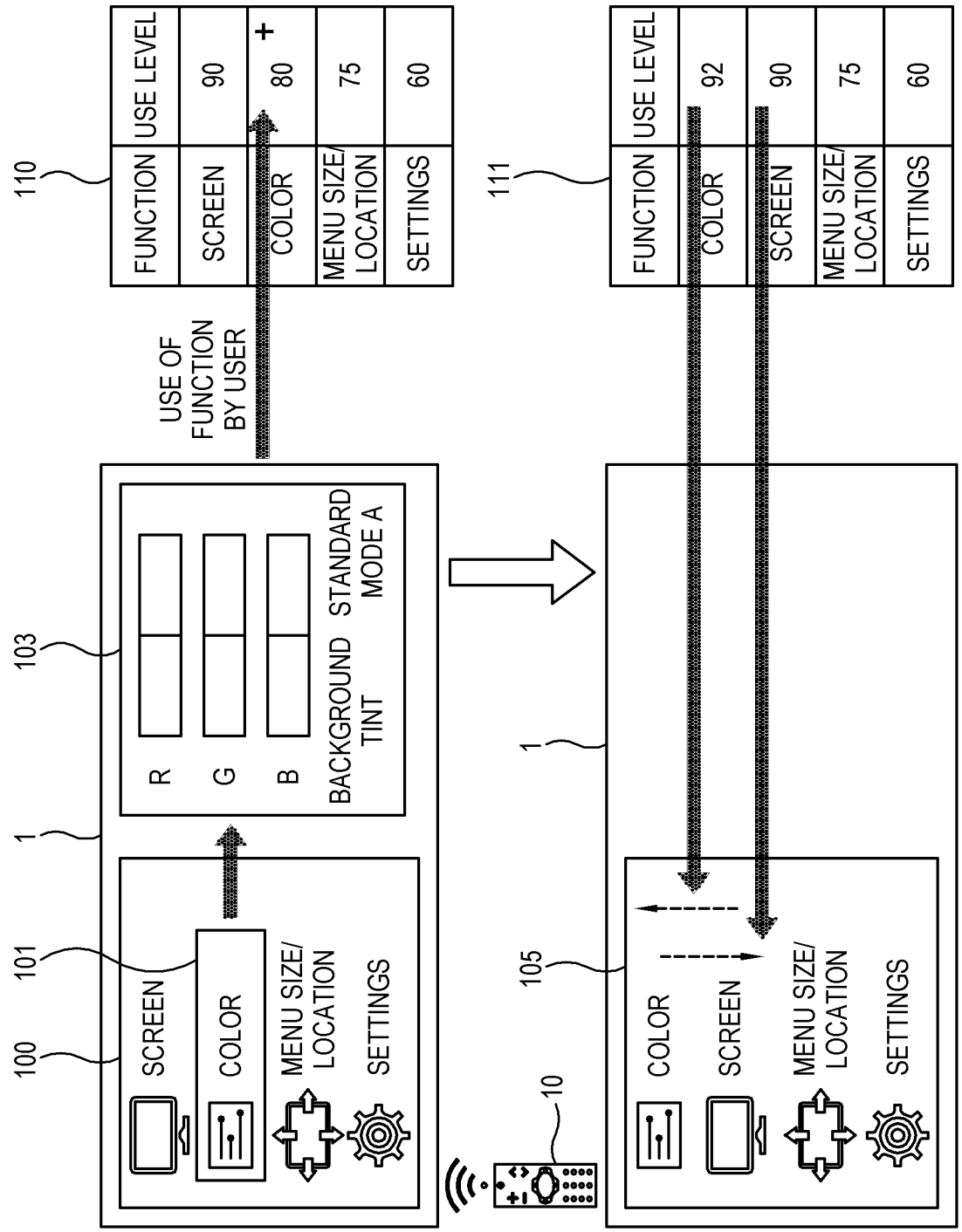
FIG. 1 is a diagram illustrating an example display apparatus according to an example embodiment.

Hereinafter, various example embodiments will be described in greater detail with reference to accompanying drawings. Elements illustrated in the accompanying drawings are referred to in the following descriptions of the example embodiments and for clarity, like reference numerals or symbols presented in respective drawings denote like elements, which substantially perform the same functions.

In the following description, if terminologies, including an ordinal number such as 'first', 'second' and the like, are used, those terminologies are used (unless expressly specified otherwise) merely to describe various elements. The terminologies are only used for the purpose of discriminating one element from other elements. In doing so, the various elements should be non-limited by the corresponding terminologies, respectively. The terminologies used in the following description of various example embodiments are for explanation purpose only and not for the purpose of limiting the example embodiments as defined by the appended claims and their equivalents.

The present disclosure described below with reference to the example embodiments may be applied to a display apparatus, which displays menu items corresponding to providable functions.

FIG. 1 is a diagram illustrating an example display apparatus according to an example embodiment. The display apparatus 1 according to an example embodiment may, for example, and without limitation, be implemented as a television (TV), or the like. As another example embodiment, the display apparatus 1 may be materialized by a device for receiving a network signal to provide contents, such as a smart phone, a tablet computer, a mobile phone, a personal computer, a multimedia player, an electronic frame, a digital advertising board, a large format display (LFD), a digital signage, a set-top box, a wearable device, such as a smart watch or a head-mount display (HMD), a refrigerator, or the like. However, the present disclosure is not limited thereto.

In an example embodiment, the display apparatus 1 displays a user interface (UI) including a plurality of menu items corresponding to providable functions. A priority of the menu items is determined, so that the more a user uses corresponding functions, the higher it is located. A menu item having a high priority may be placed at a top of the UI or an upper layer of the UI, thereby allowing the user to select it only with few or little manipulations, but the present disclosure is not limited thereto. A function use or non-use of the user is determined based on types with which the corresponding function is performed. For example, the display apparatus 1 may determine whether the user has used the corresponding function referencing various function-performing types, which include a time in which the function are performed, a time in which a result value based on the performance of the function is maintained, a degree to which the result value is changed, or the like. For example, if a menu item is selected by the user, but used for a very short time, the display apparatus 1 may not determine that the user has used a corresponding function because there is possibility that the user may have incorrectly selected it or selected it to move to other lower menu. If after a menu item is selected by the user, it is used for more than predetermined time or a result value based on a performance of a function corresponding thereto is maintained for more than predetermined time, the display apparatus 1 may determine that the user has actually used the corresponding function. This will be described in greater detail below.

Hereinafter, a process of changing a configuration of the UI or the plurality of menu items based on a degree of use for the function will be described. As an example, functions providable by the display apparatus 1 may include changing various settings of the display apparatus 1, but the present disclosure is not limited thereto. For example, the functions may also include providing contents by executing stored applications. The UI may include an upper layer including a plurality of parent menu items 100, and a lower layer including a plurality of child menu items 103 corresponding to the plurality of parent menu items 100, respectively. If the user selects a menu item 101 corresponding, for example, to a color change function in the upper layer using, for example, a remote control or the like, the display apparatus 1 displays a plurality of child menu items 103 corresponding to the color change function. Subsequent operations of the color change function may include, for example, density adjustment of respective color components in RGB color gamut, background tint adjustment and mode settings, but is not limited thereto. As the user adjusts or manipulates the menu items 103 of the lower layer, the display apparatus 1 performs the color change function.

A reference numeral 110 illustrates a state before the degree of use (hereinafter, also referred to a 'use level') for the function is changed. If it is determined that the color change function is used based on the performed type of the function, the display apparatus 1 increases a use level of the color change function. The use level may be additionally increased based on a time and a frequency in which the color change function is performed. A reference numeral 111 illustrates a state after the use level of the color change function is increased based on the result of determining that the user has used the color change function. The display apparatus 1 changes a location of respective parent menu items 105 based on the changed user level.

If it is determined that the user does not use the color change function of the menu item 101, the use level is not changed. The use level of the function may be additionally changed based on a number of times, a time, a frequency, etc. in which the function is performed. The use level of the function may be reduced if the function is not performed for a predetermined time, and additionally reduced as the non-performed time is increased.

As the menu item 101 is more frequently or much more used, the color change function is placed at the top of the UI, thus the user may select the color change function with less manipulations of the UI.

As another example embodiment, the display apparatus 1 may change an order of the child menu items 103 of the lower layer based on use levels of the corresponding functions, so that child menu items 103 of frequently used functions are placed at positions adapted to provide better access for the user, or an order of parent menu items 100 based on use levels of the functions according to selection for the child menu items 103 of the lower layer, so that access to the parent menu items 100 of frequently used functions is improved. Also, the display apparatus 1 may place at least a portion of the child menu items 103 on the upper layer to allow the user to easily access thereto.

As an additional example embodiment, the display apparatus 1 may move at least one of parent menu items 100 to the lower layer of child menu items 103 related thereto, taking into account a use pattern of a corresponding function. For example, the user may frequently and continuously use more than two functions. For example, the user may use a first function by selecting a first parent menu item 100 in the upper layer and selecting child menu items 103 in the lower layer, and then use a second function by moving to the upper layer again and selecting a second parent menu item 100. Frequent and continuous use of more than two functions requires additional manipulations for movement between the upper layer and the lower layer and selection of different menu items, thereby resulting in user's inconvenience. To address such a user's inconvenience, if after use of the first function corresponding to the first parent menu item, use of the second function corresponding to the second parent menu item by re-movement to the upper layer is frequently repeated within a predetermined time, the display apparatus 1 may move the second parent menu item into the lower layer of the child menu items 103 corresponding to the first parent menu item. The second parent menu item included in the child menu items 103 of the first parent menu item is removed from of the upper layer of the parent menu items 100, but not limited thereto. According to example embodiments, the second parent menu item may remain as a parent menu item of the upper layer to provide a link for access to the second parent menu item included in the child menu items 103 of the first parent menu item. The present example embodiment takes into account the use pattern of the functions, thereby improving user's use convenience.

Although in the example embodiments, as an example of the change in configuration of the UI or the plurality of menu items, changing the location of the respective menu items based on the use level of functions has been explained, the present disclosure is not limited thereto.

Figure 2:
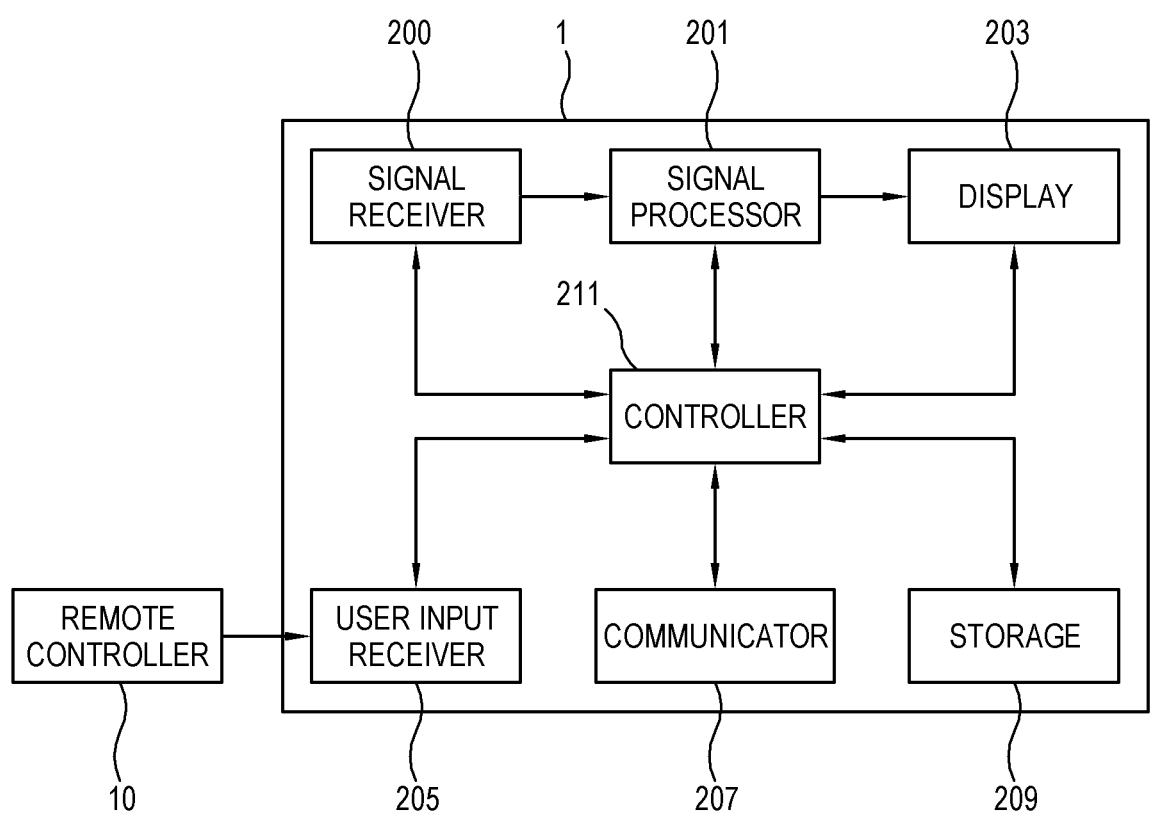
FIG. 2 is a block diagram illustrating an example display apparatus according to an example embodiment.

FIG. 2 is a block diagram illustrating an example display apparatus according to an example embodiment. The display apparatus 1 according to an example embodiment includes a display 203, a user input receiver (e.g., including input receiving circuitry) 205, and a controller (e.g., including processing circuitry) 211. The display apparatus 1 according to an example embodiment may further include at least one of a signal receiver (e.g., including signal receiving circuitry) 200, a signal processor (e.g., including signal processing circuitry) 201, a communicator (e.g., including communication circuitry) 207 and a storage 209. The structure of the display apparatus 1 illustrated in FIG. 2 is just given by way of example, and the display apparatus 1 according to an example embodiment may be materialized to include another element in addition to the elements illustrated in FIG. 2, or exclude a certain element from the elements illustrated in FIG. 2.

The signal receiver 200 may include varius signal receiving circuitry that receives a signal of content from an external. The signal of content may include, for example, a broadcast signal. The signal receiver 200 may include, for example, a tuner for receiving the broadcast signal from a broadcast signal transmitting apparatus or a relay equipment for relaying the broadcast signal. The tuner may receive tuning a broadcast signal of any one selected by the user from among a plurality of channels. The signal receiver 200 may also receive the signal of content from a server via a network.

The display apparatus 1 may be materialized by a mobile device, such as a hand phone, a smart phone, a tablet personal computer (PC), or the like, but is not limited thereto. If the display apparatus 1 is materialized by the mobile device, it may include a mobile communicator including communication circuitry for connecting with an external apparatus via mobile communication. The mobile communicator communicates with an external apparatus having more than at least one antenna, and transmits and received a wireless signal for voice call, video call, text message, or multimedia message.

The signal processor 201 may include various signal processing circuitry and/or program elements and performs an image processing process with respect to the signal of content received via the signal receiver 200 and outputs the processed image signal to the display 203 to display an output image on the display 203. The image processing process, which is performed by the signal processor 201, may include, for example, and without limitation, demultiplexing to divide a content signal including video and audio into subordinate streams, which includes an image signal, an audio signal and additional data, respectively, de-interlacing to convert an interlace type image signal into a progressive type image signal, scaling to change the image signal in definition, noise reduction for enhancing image quality, detail enhancement, frame refresh rate conversion, or the like.

The display 203 displays an image of content based on the signal processed by the signal processor 201. Implemented types of the display 203 are not limited, and the display 203 may be implemented in various display ways, for example, and without limitation, such as liquid crystal display (LCD), plasma display panel (PDP), light-emitting diode (LED) display, organic light emitting diodes (OLED) display, surface-conduction electron-emitter, carbon nano-tube, nano-crystal display, or the like.

If the display 203 is a LCD type, it includes a LCD panel, a backlight unit to supply light to the LCD panel, a panel driving board to drive the LCD panel, etc. The display 203 may be also implemented as an OLED panel, which is a spontaneous emission element, without the backlight unit.

The communicator 207 may include various communication circuitry, such as, for example, and without limitation, a connecting part for wired communication. The connecting part may transmit/receive signals/data based on standards, such as, for example, and without limitation, high definition multimedia interface (HDMI), HDMI-consumer electronics control (CEC), universal serial bus (USB), component and so on, and include more than at least one connector or terminal corresponding to the standards, respectively. The communicator 207 may communicate by wire with a plurality of servers via wired local area network (LAN).

The communicator 207 may include various other communication circuitry other than the connecting part including the connector or terminals for wired connection. For example, and without limitation, the communication circuitry of the communicator 207 may perform wireless communication, wireless short-range communication or the like via wireless LAN. The communicator 207 may include a radio frequency (RF) circuit for transmitting and receiving a RF signal to perform wireless communication with the external apparatus and may be configured to perform communication via at least one from among wireless fidelity (Wi-Fi), Bluetooth, Zigbee, ultra-wide band (UWB), wireless USB, near field communication (NFC) and infrared data association (IrDA).

The storage 209 is configured to store various data of the display apparatus 1. The storage 209 may be materialized by a non-volatile memory, such as a flash memory, an EPROM, an EEPROM, etc. The storage 209 may be further provided with a volatile memory, such as a DRAM or a SRAM, which has a reading or writing speed faster than the non-volatile memory. As an example, the storage 209 may store information about the functions and use levels of the functions used by the user.

The user input receiver 205 may include various input circuitry and receives an input, e.g., a user input, to transmit to the controller 211. The user input receiver 205 may be implemented in various types based on the types of manipulation performed by the user. For example, the user input receiver 205 may be implemented by a menu button installed on an outer side of the display apparatus 1, a remote control signal receiver to receive a remote control signal corresponding to a user input received from a remote controller 10 (hereinafter, also referred to a 'remocon'), a touch screen provided in the display 203 to receive a touch input of the user, a camera to detect a gesture input of the user, a microphone to recognize a voice input of the user, a sensor to detect a movement or motion of the user, or the like, but is not limited thereto. As an example, the user input includes an input to select one from among a plurality of menu items (100 and 103 in FIG. 1) in the UI, and an input to instruct performance of functions.

The controller 211 may include various processing circuitry and performs controls needed for operating all the elements of the display apparatus 1. The controller 211 may include a control program for controlling to perform the control operations, a non-volatile memory in which the control program is installed, a volatile memory in which at least one of the control program is loaded, and at least one microprocessor or central processing unit (CPU) for executing the loaded control program. The control program may include a program (or programs) which is implemented in the form of at least one of a BIOS, a device driver, an operating system, a firmware, a platform, and an application program (application). As an example embodiment, the application program may be installed or stored in advance in the display apparatus 1 in manufacturing, or installed in the display apparatus 1 based data for the application received from the external in use. The data for the application program may be downloaded to the display apparatus 1 from an external server, such as, for example, an application market or the like. The signal processor 201 and the controller 211 may be implemented by individual processors, respectively, or a single processor in which two constructions thereof are integrated. A processor corresponding to the controller 211 may be implemented to perform at least a portion of a function of the signal processor 201 or vice versa.

As an example embodiment, the controller 211 displays changing a configuration of the UI including the plurality of menu items 100 to allow the user to more easily select frequently used menu items. The controller 211 performs functions based on user inputs for selecting menu items and user inputs for instructing performance of functions, and determines whether the user has used the functions based on types in which the functions are performed. If it is determined that the user has used the functions, the controller 211 controls the display 203 to rearrange the menu items, so that the higher use levels of corresponding functions are located higher in the UI or placed in the upper layer rather than the lower layer of the UI, and to display the UI in which the menu items are rearranged.

Figure 3:
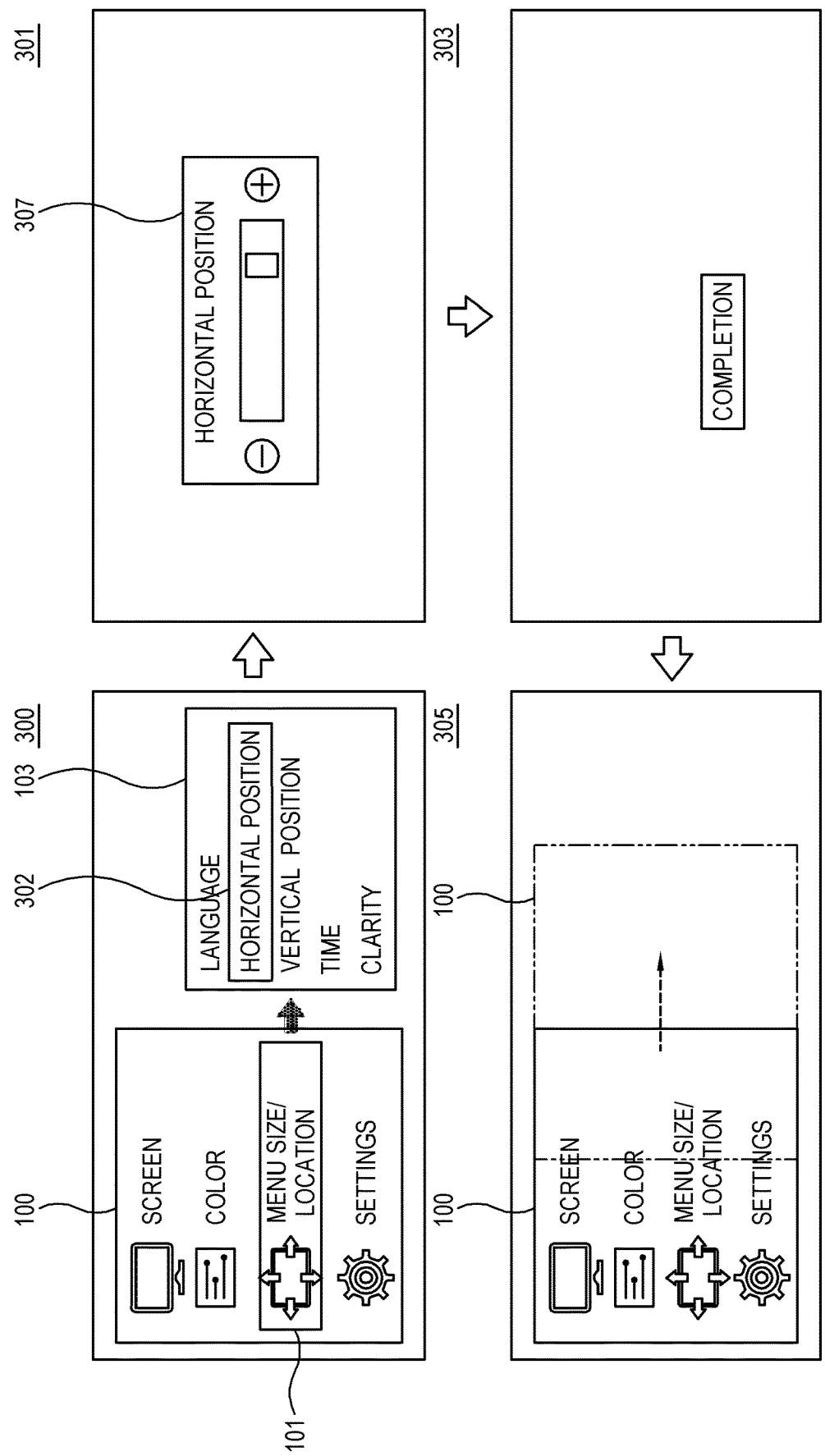
FIG. 3 is a diagram illustrating example operations in which menu items are displayed and a function is performed according to an example embodiment.

FIG. 3 is a diagram illustrating example operations in which menu items are displayed and a function is performed according to an example embodiment.

A reference numeral 300 illustrates an operation of selecting a UI including a plurality of menu items 100 and a menu item 101 from among the plurality of menu items 100. If a menu item 101 corresponding to a menu size/location change function is selected from among the plurality of parent menu items 100, the display apparatus 1 displays a plurality of child menu items 103 of a lower layer corresponding to the selected parent menu item 101. A reference numeral 301 illustrates an operation in which the function is performed based on an input of the user as a performance initiating operation. In this operation, the user selects a menu item 302 for adjusting a horizontal position of menu from among the plurality of child menu items 103 and manipulates a UI 307 displayed on a screen to change the horizontal position of menu. A reference numeral 303 illustrates an operation in which the function performance is completed. However, according to example embodiments, a screen for guiding that the function performance is completed may be omitted. A reference numeral 305 illustrates an operation in which after the function performance is completed, a result of the function performance is applied to the display apparatus 1. In the example embodiment, the display apparatus 1 displays the UI in which the horizontal position is moved.

Figure 4:
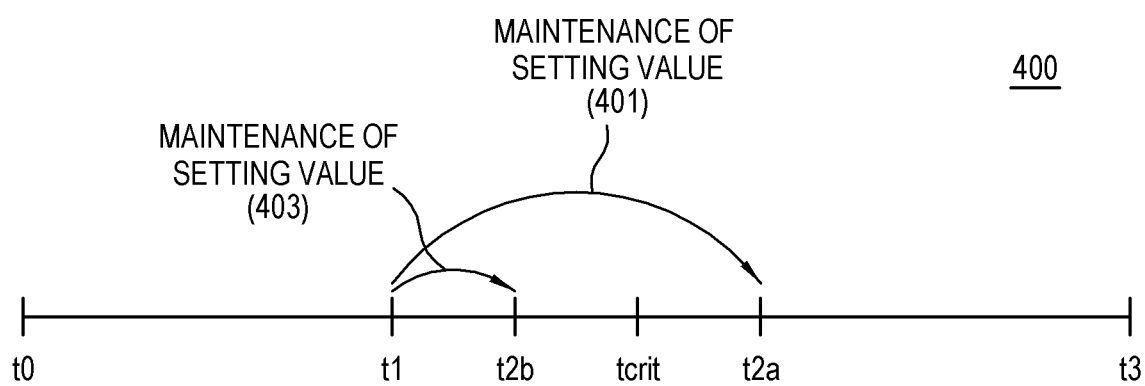
FIG. 4 is a diagram illustrating an example of determining whether a user has used a function based on a time in which the function is performed, according to an example embodiment.
Figure 5:
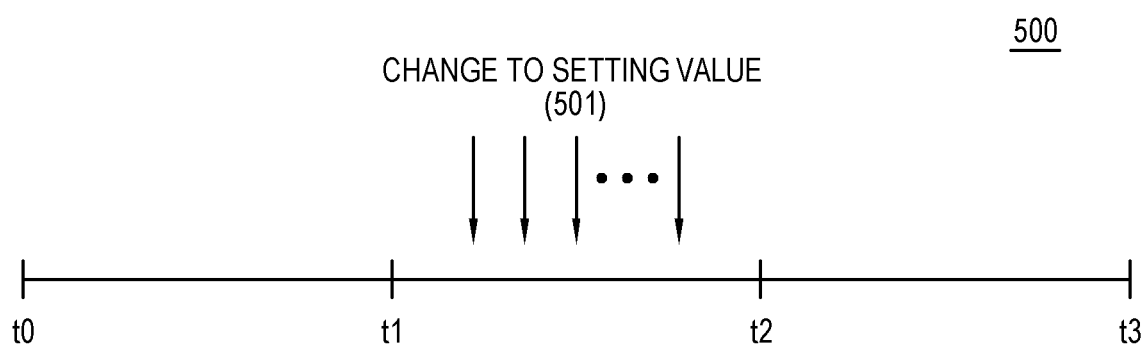
FIG. 5 is a diagram illustrating an example of determining whether the user has used a function based on a frequency in which the function is performed, according to an example embodiment.
Figure 6:
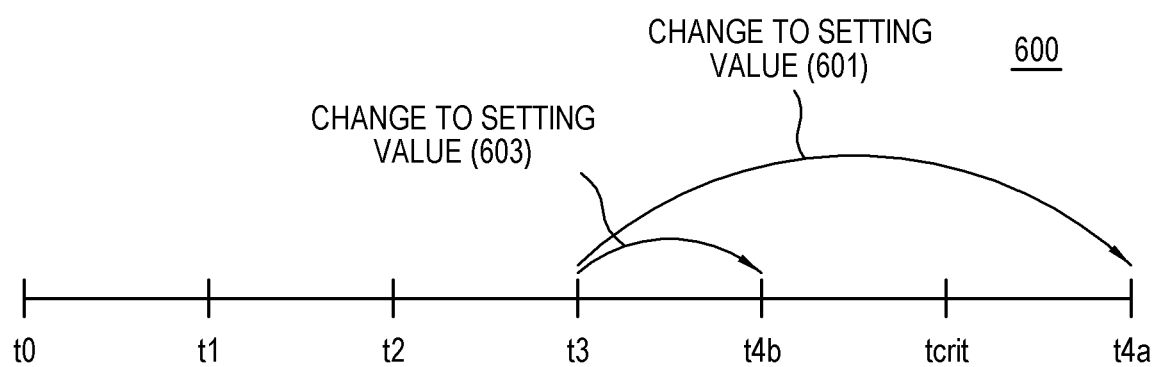
FIG. 6 is a diagram illustrating an example of determining whether the user has used a function based on a time in which a result value based on the performance of the function is maintained, according to an example embodiment.

Hereinafter, an example embodiment in which the display apparatus 1 determines whether the user has used a function based on function-performing types will be described with reference to the accompanying drawings. FIGS. 4, 5 and 6 are diagrams illustrating example function-performing types of the display apparatus 1 over time. In FIGS. 4, 5 and 6, a plurality of time points includes t0, t1, t2, and t3, which correspond to operations performing the function in FIG. 3, respectively. The time point t0 is a time point where a menu screen is selected for the function performance at the reference numeral 300 in FIG. 3. The time point t1 is a time point where the function performance begins at the reference numeral 301 in FIG. 3. The time point t2 is a time point where the function performance is completed at the reference numeral 303 in FIG. 3. The time point t3 is a time point where after the function performance is completed, a result of the function performance is applied. If the function is changing settings for the display apparatus, changed setting value is applied at this section. According to example embodiments, the time point t2 may be omitted or may be the same time point as the time point t3.

FIG. 4 is a diagram illustrating an example of determining whether the user has used a function based on a time in which the function is performed according to an example embodiment. A reference numeral 400 is a graph showing whether the function performance time passes a critical time tcrit. At a time point to, a menu item (101 in FIG. 3) is selected, and at a time point t1, a function performance begins. The controller 211 determines whether the user has used the function based on whether the critical time tcrit elapses. For example, if a function performance 401 begins at a time point t1 and is completed at a time point t2a after the critical time tcrit has passed, the controller 211 determines that the user has used the function based on a type in which the function is performed. If a function performance 403 begins at the time point t1 and is completed at a time point t2b before the critical time tcrit elapses, the controller 211 determines that the user has not used the function based on a type in which the function is performed.

FIG. 5 is a diagram illustrating an example of determining whether the user has used a function based on a frequency in which the function is performed, according to an example embodiment. A reference numeral 500 is a graph showing a number of times the function is performed. At a time point to, a menu item (101 in FIG. 3) is selected, and at a time point t1, the function is performed. The controller 211 determines whether a number of times per unit time, e.g., a frequency at which the function performance 501 occurs is equal to or more than a predetermined critical value. As an example, the controller 211 may determine the number of times in which the function is performed from a number of times per unit time in which the menu item 101 is selected and a user input for instructing the function performance is received. As another example, the controller 211 may determine the frequency at which the function is performed from a number of times in which a specific menu item 101 or a specific menu item 302 of the lower layer is selected.

If the frequency at which the function is performed is equal to or more than the predetermined critical value, the controller 211 may determine that the user has used the function. If an input for manipulating the UI (307 in FIG. 3) to adjust the horizontal position of menu is received more than a predetermined frequency, the controller 211 may determine that the user has used the function.

FIG. 6 is a diagram illustrating an example of determining whether the user has used a function based on a time in which a result value based on the function performance is maintained, according to an example embodiment. A reference numeral 600 is a graph showing whether the time in which after the function is performed, the result value is maintained passes a predetermined critical time tcrit. At a time point to, a menu item (101 in FIG. 3) is selected, at a time point t1, the function is performed, and at a time point t2, the function performance is completed. After the function performance is completed, performed results are applied at a time point t3. As described above, the completion and application of the function performance may be carried out at the same time.

The controller 211 determines whether the user has used the function based on whether after the function performance is completed, the result value is maintained over the predetermined critical time tcrit. For example, if a setting value of the display apparatus 1 is changed according to the function performance and the changed setting value is maintained from a time point t2 in which the function performance is completed or a time point t3 in which the performance result is applied to a time point t4a in which the predetermined critical time tcrit elapses (601), the controller 211 may determine that the user has used the function. If after the setting value of the display apparatus 1 is changed, the changed setting value is reinstated or newly changed between the time point t2 in which the function performance is completed or the time point t3 in which the performance result is applied and a time point t4b before the predetermined critical time tcrit elapses (603), the controller 211 may determine that the user has not used the function even if the function such as the change of the setting value has been performed.

Figure 7:
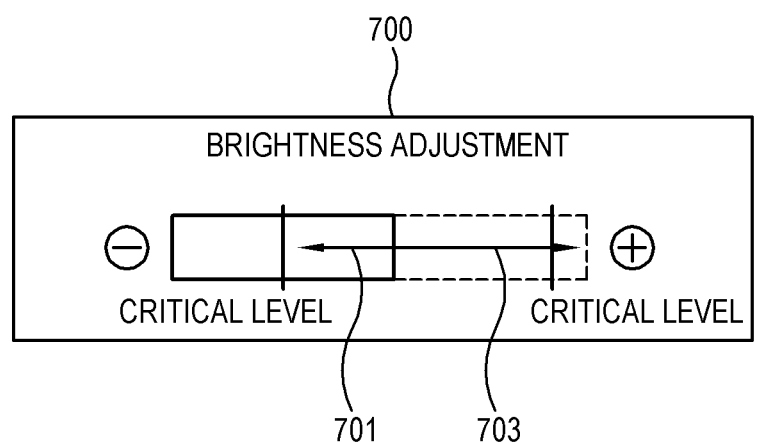
FIG. 7 is a diagram illustrating an example of determining whether the user has used a function based on the result value based on the performance of the function, according to an example embodiment.

FIG. 7 is a diagram illustrating an example of determining whether the user has used a function based on result values generated as a result of the performance of the function, according to an example embodiment. The controller 211 may determine whether the user has used the function based on the results based on the performance of the function. For example, when various setting values, such as a brightness, a clarity, a resolution and the like are changed according to the performance of the function, the controller 211 may determine that the user has used the function if the setting values are changed out of corresponding critical levels (703). If the setting values are changed without exceeding the corresponding critical levels (701), the controller 211 may determine that the user has not used the function even if the function has been performed. The critical levels are set to have a given difference in value from the current setting values.

As described above, the controller 211 determines whether the user has used the function based on the performed type of the function and if it is determined that the user has used the function, changes the use level of the function as in reference numerals 100 and 111 of FIG. 1. The controller 211 changes the configuration of the UI or the plurality of menu items 100, 103 and 105 by rearranging the menu items 100, 103 and 105 or the like, based on the changed use level of the function.

Figure 8:
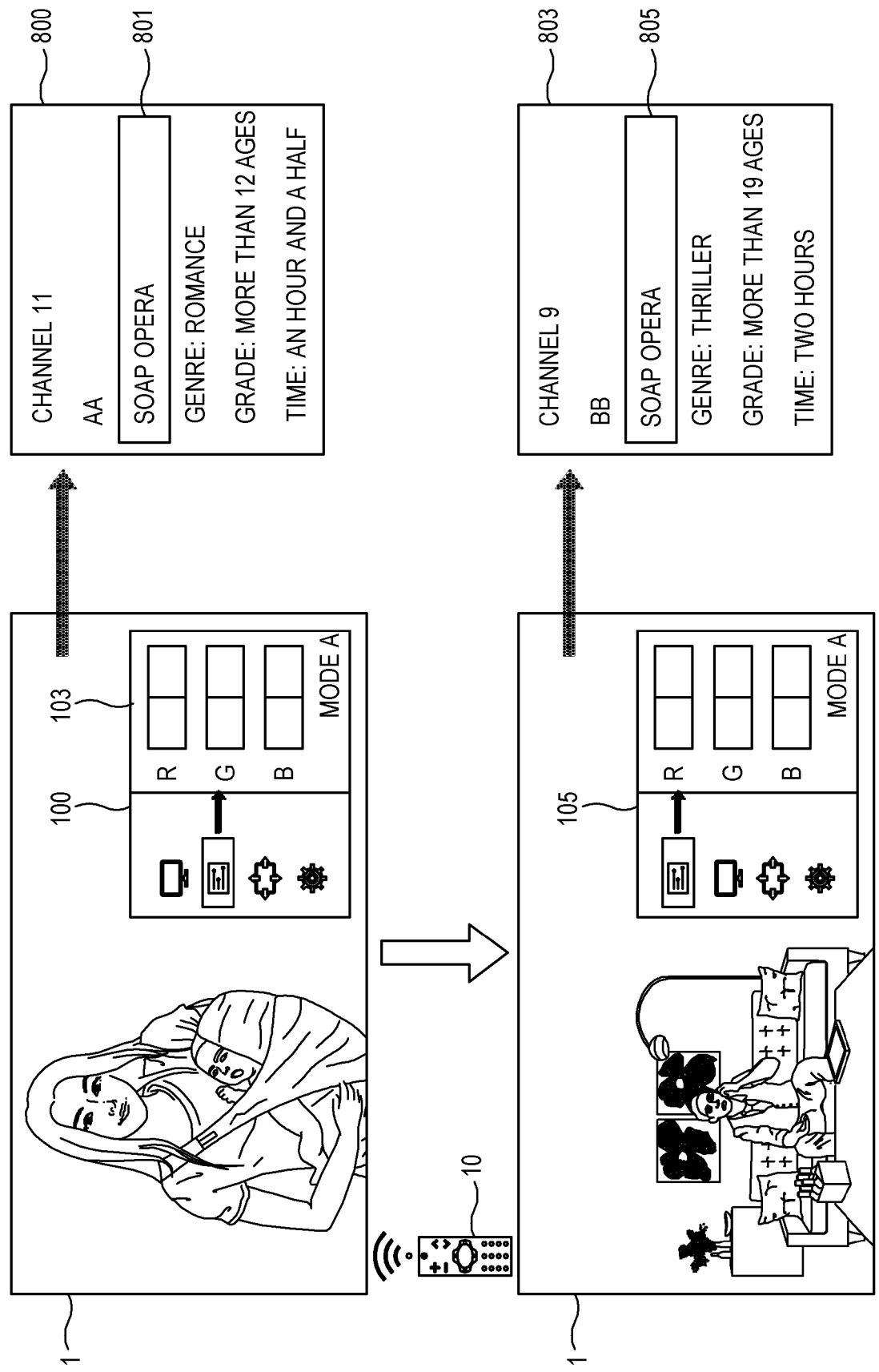
FIG. 8 is a diagram illustrating an example of determining whether the user has used a function with respect to a content being provided, according to an example embodiment.

FIG. 8 is a diagram illustrating an example of determining whether the user has used a function with respect to a content being providing, according to an example embodiment.

If the function is performed while a first content is displayed, the controller 211 determines whether the user has used the function with respect to the first content. The controller 211 may determine whether the user has used the function with respect to the first content based on a percentage of a time in which the function is performed from among a time in which the first content is provided, a percentage of a time in which setting values changed according to the performance of the function are maintained while the first content is provided, a restoration or non-restoration of the setting values within a predetermined time after the first content is finished, etc.

If it is determined that the user has used the function with respect to the first content, the controller 211 may change the configuration of the plurality of menu items based on a use level of the function used with respect to the first content, and when the first content is provided, displays a UI including the plurality of menu items of which the configuration is changed.

When a second content related to the first content is provided, the controller 211 may provide the UI having the changed configuration based on the use level of the function used with respect to the first content. To determine that the second content and the first content are related to each other, the controller 211 may compare information 800 about the first content and information 803 about the second content with each other. The information may be obtained from metadata, an electronic program guide, or the like. The information includes various information related to the first and second contents, such as content titles, kinds 801 and 805, genres, sources, providing times, content descriptions, preview images, etc. When the second content, which is the same soap opera 801 and 805 as the first content, is provided, the controller 211 displays a UI of which the configuration is changed based on the use level of the function used with respect to the first content.

As another example, if it is determined that a function has been used when the first content is provided, the controller 211 records and changes use levels of the function to all items of the information 800 about the first content, and changes a configuration of the UI or the plurality of menu items based on the use levels of the function. If it is determined that at least a portion of items of the information 803 about the second content is equal to the items of the information 800 about the first content of which the use levels are record, the controller 211 provides the UI having the changed configuration.

FIG. 9 is a diagram illustrating an example of determining whether the user has used a function with respect to a specific time according to an example embodiment.

If it is determined that the user has used the function, the controller 211 may determine whether the function is used with respect to a specific time. This may be determined based on types in which the function is performed, such as using the function more than a predetermined number of times at the specific time, maintaining setting values changed according to the performance of the function only for a time close to the specific time, or the like.

If it is determined that the user has used the function with respect to the specific time, the controller 211 may change the configuration of the plurality of menu items based on the use level of the function. When it comes to the specific time again, the controller 211 displays a UI including the plurality of menu items of which the configuration is changed.

Figure 10:
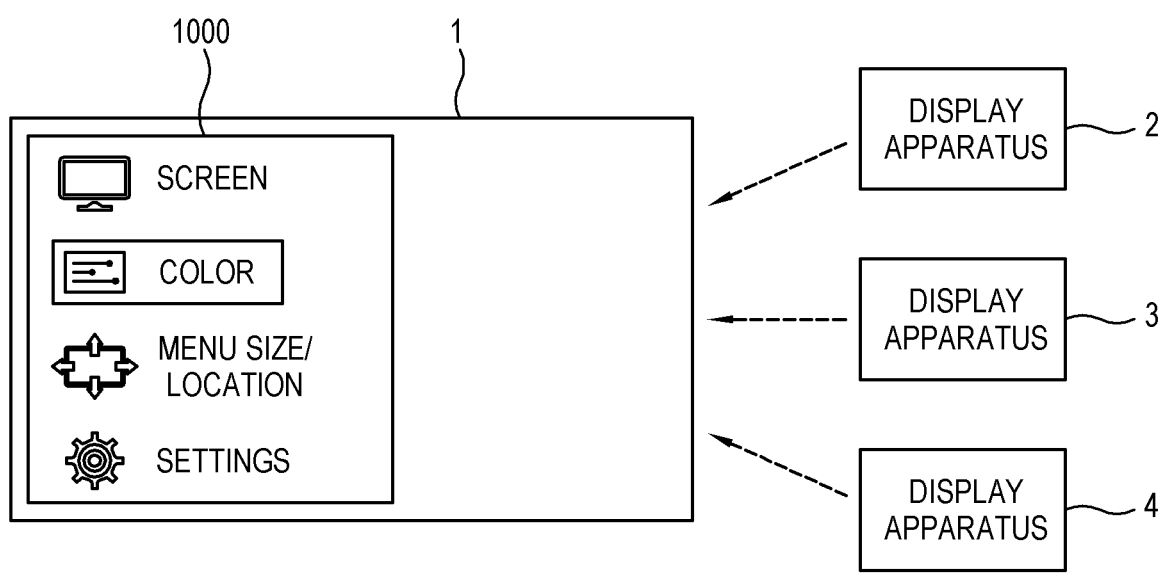
FIG. 10 is a diagram illustrating an example of receiving function-using information of other user to change a configuration of a plurality of menu items, according to an example embodiment.

FIG. 10 is a diagram illustrating an example of receiving function-using information of other users to change the configuration of the plurality of menu items according to an example embodiment.

The display apparatus 1 may further include a communicator 207 comprising various communication circuitry for communication. If the function-using information of the other users is received from other display apparatuses through the communicator 207, the controller 211 further changes the configuration of the plurality of menu items, further based on the function-using information of the other users. The function-using information of the other users may be received directly or via an external server from other display apparatuses 2, 3, and 4. The external server may transmit to the display apparatus 1, analysis information based on the function-using information of the other users. For example, the external server may provide information adapted to the user of the display apparatus 1 using information about, for example, and without limitation, ages, regions, interests and the like of the other users. The controller 211 may change a use level of the function using the function-using information of the other users. A percentage where the controller 211 refers to the function-using information of the other users in changing the use level of the function may be varied based on a selection of the user or the like. A reference numeral 1000 illustrates an example of a UI including a plurality of menu items of which the configuration is changed using the function-using information of the other users.

Figure 11:
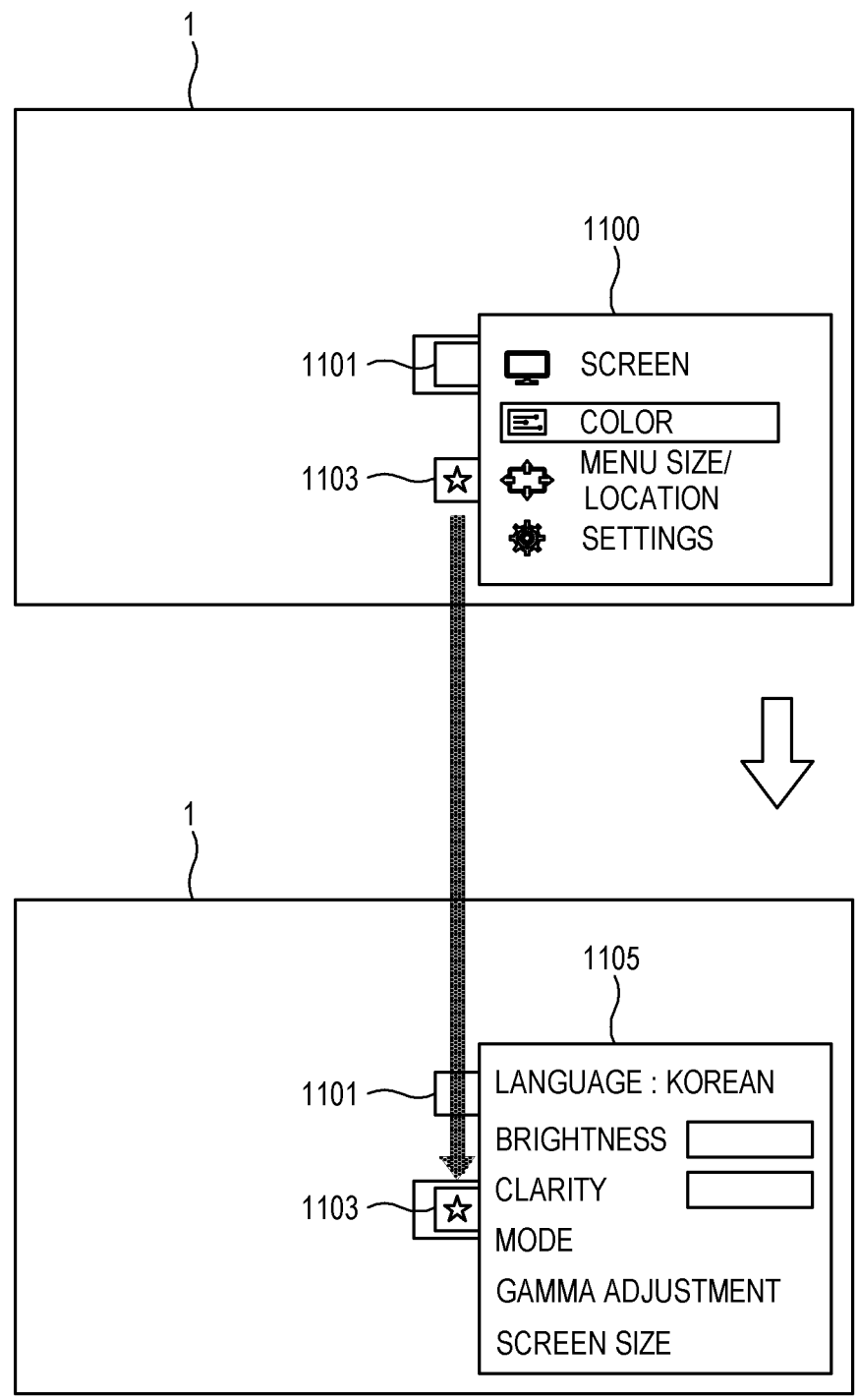
FIG. 11 is a diagram illustrating an example of a user interface (UI) according to an example embodiment.

FIG. 11 is a diagram illustrating an example of the UI according to an example embodiment.

The controller 211 displays a UI including a plurality of menu items 1100 before locations thereof are changed according the selection of the user, or a plurality of menu items 1105 arranged according to the use level of the function. If a first tap 1101 is selected, the controller 211 may display the plurality of menu items 1100 before the locations thereof are changed, and if a second tap 1103 is selected, the controller 211 may display the plurality of menu items 1105 rearranged according to the use level of the function. The second tap 1103 may configured to display merely the plurality of rearranged menu items 1100 corresponding to the first tap 1100 based on an order of priority, or selecting a portion with high use level among the menu items of the lower layer.

As another example embodiment, if while the plurality of menu items 1100 before the locations thereof are changed is displayed, a user input for arranging the plurality of menu items 1100 is received, the controller 211 displays arranging the plurality of menu items 1100 based on the use level of the function. The controller 211 may display the plurality of menu items 1105 selected based on the use level of the function based on the user input. The UI may further include a button for arranging the plurality of menu items 1100.

Figure 12:
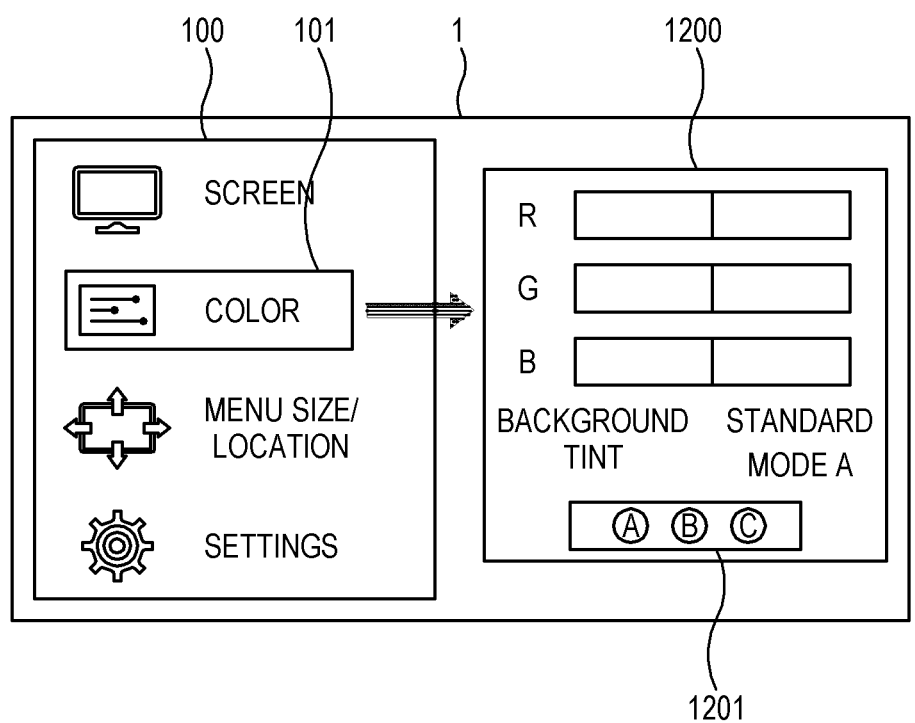
FIG. 12 is a diagram illustrating an example of providing a setting preferred by the user as a menu item according to an example embodiment.
Figure 13:
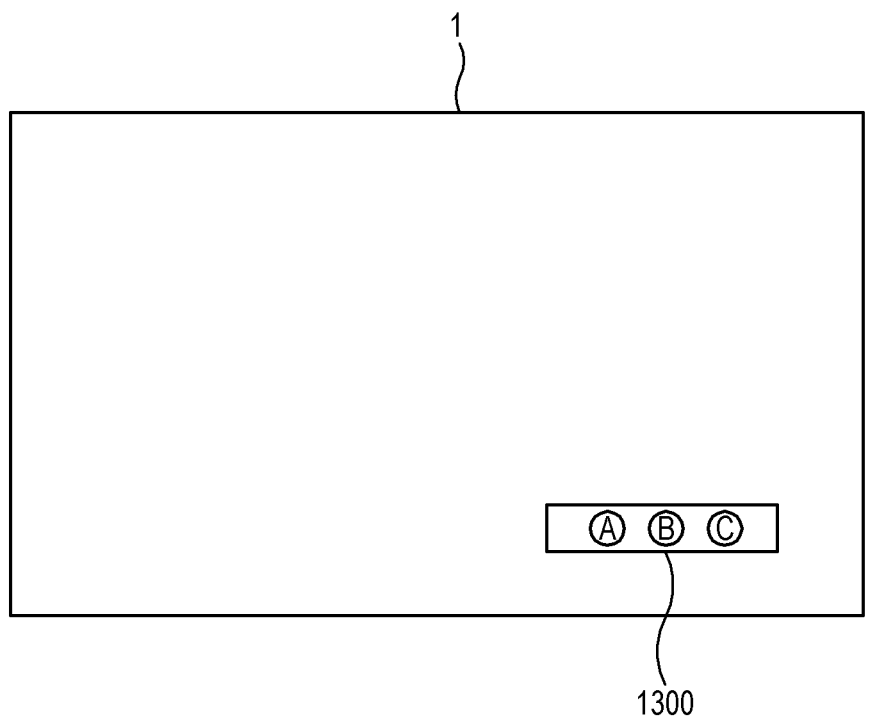
FIG. 13 is a diagram illustrating another example of providing the setting preferred by the user as the menu item according to an example embodiment.

FIGS. 12 and 13 are diagrams illustrating examples of providing settings preferred by the user as menu items according to an example embodiment.

If it is determined that setting values of the display apparatus 1 are changed as a result of the performance of the function and the changed setting values are preferred by the user, the controller 211 may provide a favorite item 1201 or 1300 corresponding to the changed setting values, so that the display apparatus 1 can be easily set to the changed setting values later. A preference or non-preference of the user to the changed setting values may be determined based on a frequency where a setting value is changed, a time in which a setting value is changed and maintained, a level to which a setting value is changed, and so on. For example, if the user sets a first setting value and changes the first setting value to a second setting value after a predetermined time elapses, the controller 211 may provide the first setting value as the favorite item 1201 or 1300.

The favorite item 1201 or 1300 may include various setting values of the display apparatus 1. The favorite item 1201 or 1300 may be, for example, incorporated in a lower layer 1200 displayed based on a selection of a specific parent menu item 101, or provided as a separate menu item 1300.

Figure 14:
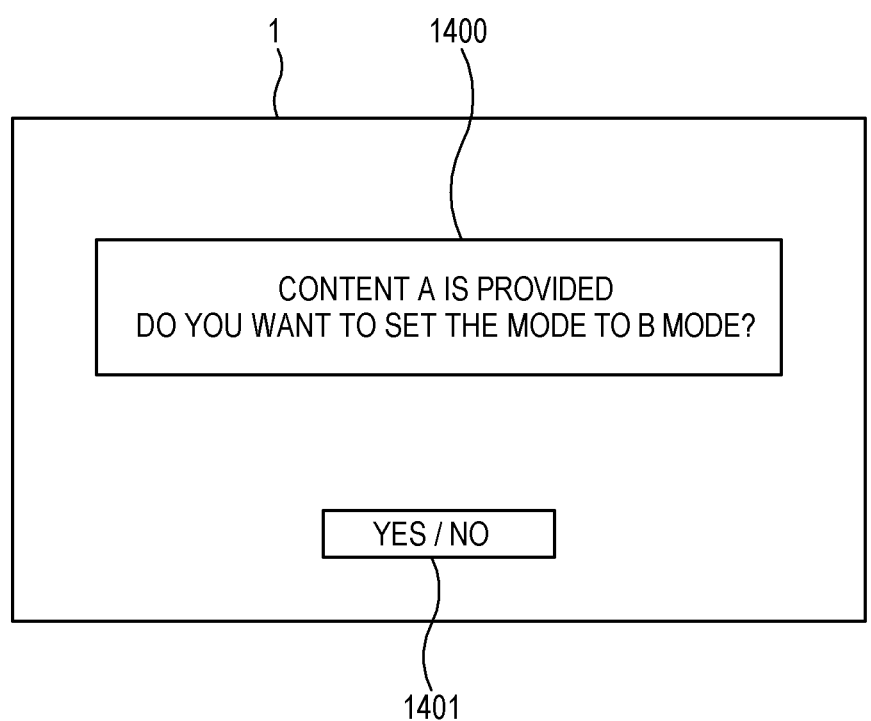
FIG. 14 is a diagram illustrating an example of changing a setting value when a specific content is provided, according to an example embodiment.

FIG. 14 is a diagram illustrating an example of changing a setting value when a specific content is provided according to an example embodiment.

The controller 211 may determine a setting value as a favorite setting value for a specific content based on whether the user changes/maintains the setting value at the specific content. If the specific content is provided, the controller 211 provides a favorite item 1201 or 1300 to allow the user to easily select the favorite setting value, or changes the setting value to the favorite setting value. For example, if a B mode is determined as a favorite setting value for an A content, as illustrated in the drawing, the controller 211 may, when the A content is provided again, guide that the A content is provided (1400) and request an approval with respect to whether to change the mode or setting to the B mode (1401).

As another example, when a second content related to a first content is provided, the controller 211 may provide as a favorite item 1201 or 1300, a setting value determined as a favorite setting value for the first content, or change the setting to the favorite setting value for the first content. A relevance between the first content and the second content information may be determined referring to metadata or an electronic program guide, as described above. For example, if a B mode is determined as a favorite setting value for an A content, the controller 211 may, when a B content determined as being related to the A content based on genres, grades and the like is provided, seek an approval with respect to whether to change the setting to the B mode.

The controller 211 may determine a setting value as a favorite setting value for a specific time zone based on whether the user changes/maintains the setting value at the specific time zone, as well as the content. When it comes to the specific time zone, the controller 211 provides a preferred item 1201 or 1300 or changes the setting value to the favorite setting value. For example, if it is determined that the user prefers to lower a brightness and an audio volume in a late evening time, the controller 211 may lower the brightness and the audio volume every late evening time.

As additional example embodiment, the display apparatus 1 may further include a camera to detect a watching location of the user and a number of the user. The controller 211 may determine a favorite setting value of the user according the watching location or the number of the user detected through the camera. For example, the user may prefer to lower the brightness and the audio volume within a predetermined distance and to change the mode to a sport mode and increase the audio volume when the number of the user is more than a given number. If a predetermined watching location and a predetermined number of the user are satisfied, the controller 211 may provide a favorite item 1201 or 1300 or change the setting value to a favorite setting value.

Figure 15:
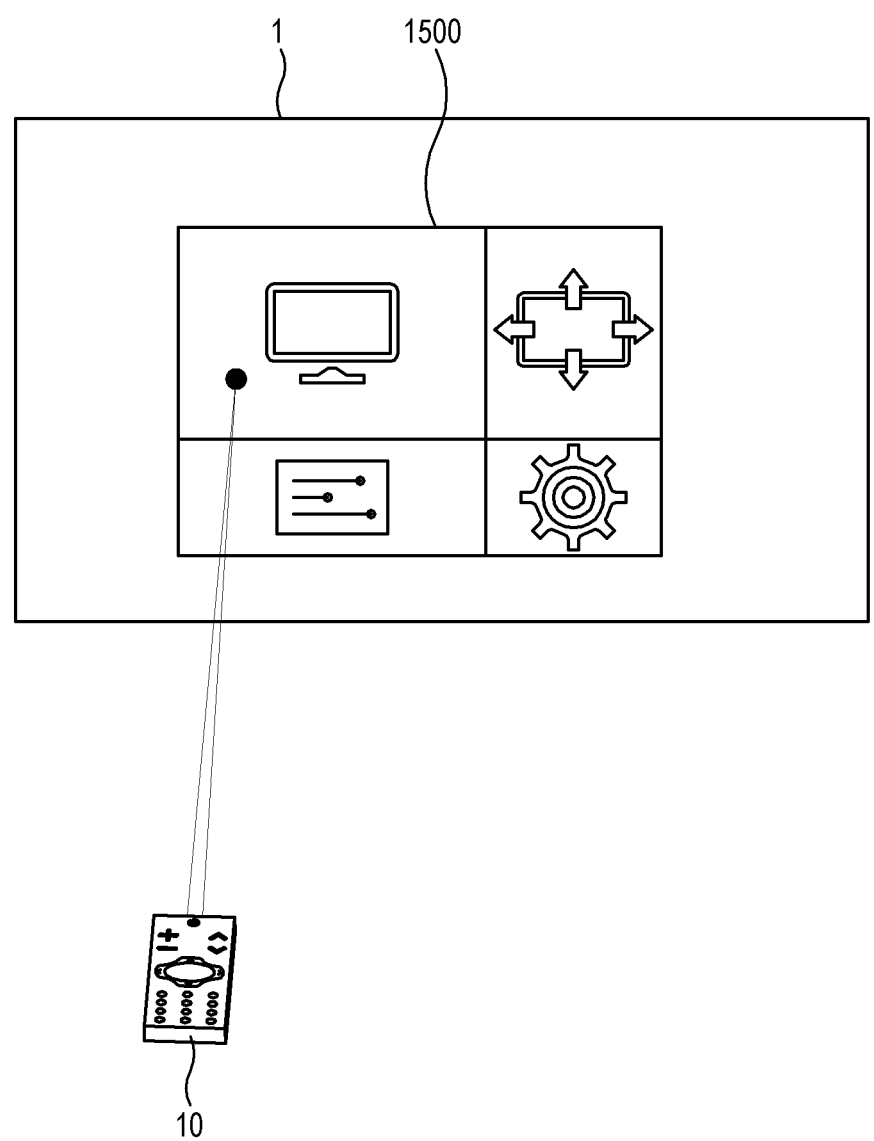
FIG. 15 is a diagram illustrating an example of changing a size and a location of the menu items based on a degree to which the function is used, according to an example embodiment.

FIG. 15 is a diagram illustrating an example of changing a size and a location of the menu items based on a degree in which the function is used, according to an example embodiment.

A remote controller 10 may select any one of a plurality of menu items 1500 by pointing at it. In this case, to allow the user to easily select menu items of frequently used functions, the controller 211 changes the size and the location of the menu items 1500 based on the degree in which the function is used, thereby changing a configuration of the plurality of menu items 1500.

The change of the configuration of the plurality of menu items 1500 is not limited to the explanations and the example embodiments, as described above. According to example embodiments, the controller 211 may change a color of the menu items 1500 or provide the menu items 1500 as pop-up items, thereby allowing the user to easily select menu items of frequently or much used functions, or the like.

Figure 16:
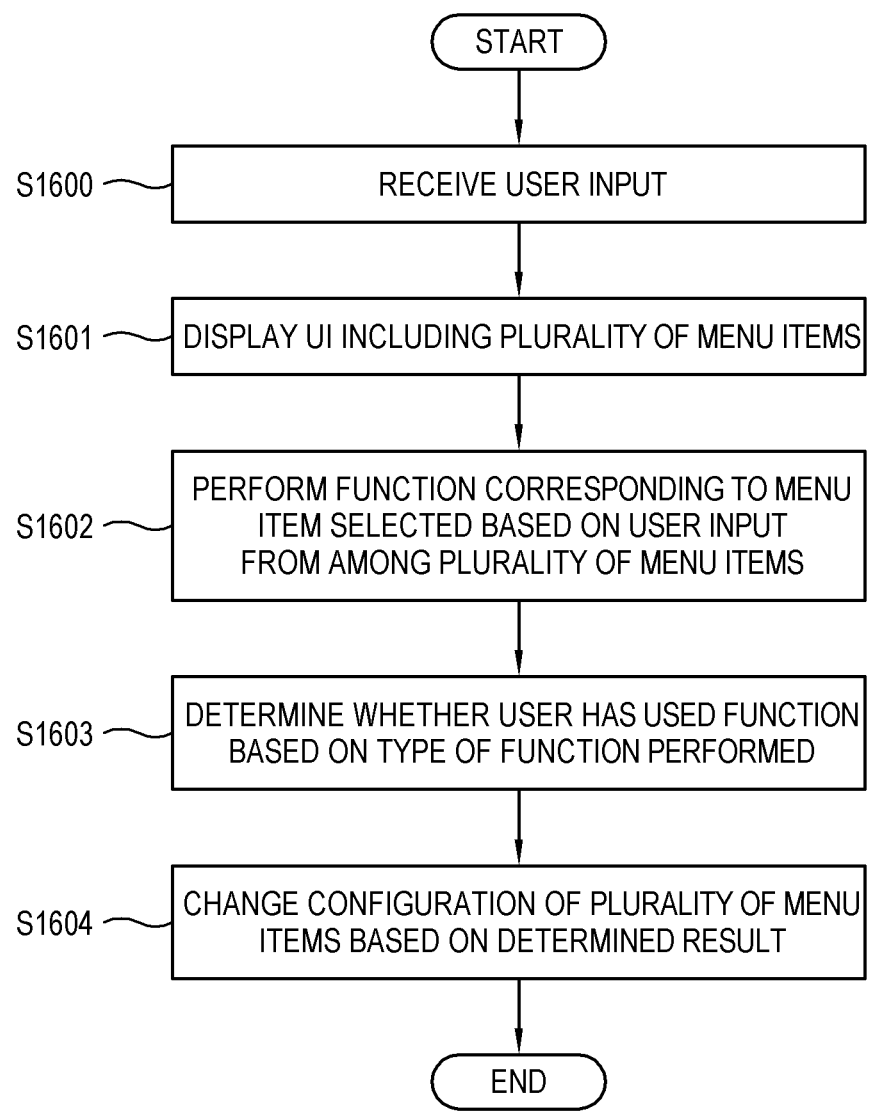
FIG. 16 is a flowchart illustrating an example method of controlling the display apparatus according to an example embodiment.

FIG. 16 is a flowchart illustrating an example method of controlling the display apparatus according to an example embodiment.

At an operation S1600, the user input receiver 205 receives a user input. At an operation S1601, the controller 211 displays a UI including a plurality of menu items on the display 203. At an operation S1602, the controller 211 may perform a function corresponding to a menu item selected based on the user input from among the plurality of menu items. At an operation S1603, the controller 211 determines whether the user has used the function based on a type of the function performed. At an operation S1604, the controller 211 changes a configuration of the plurality of menu items based the determined result.

Moreover, in the control method of the display apparatus 1 illustrated in FIG. 16, the configuration of the display apparatus 1 explained with reference to FIGS. 1 to 15 may be applied in the same or similar manner.

As described above, according to the example embodiments, the display apparatus may provide the menu items corresponding to the frequently or primarily used functions to allow the user to easily access thereto, thereby improving the use convenience.

While various example embodiments have been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:

a display;

an input receiver comprising input receiving circuitry configured to receive an input; and a processor configured to:

control the display to display a user interface (UI) including a plurality of menu items, each respective menu item representing a different function to be performed by the display apparatus when the respective menu item is selected;

based on an input to select one of the plurality of menu items being received through the input receiver, identify a time during which a function corresponding to the selected menu item has been used;

based on the identified time, count at least one of a number of times or a frequency that the function has been used; and based on the counted at least one of the number of times or the frequency, change an arrangement order of the plurality of menu items, wherein the processor is further configured to, based on the time being less than a predetermined time, exclude from counting the number of times or the frequency.

2. The apparatus according to claim 1, wherein the processor is configured to:

receive a first input to select a first menu item and sequentially receive a second input to select a second menu item through the input receiver;

based on a time between the first input and the second input being less than a predetermined time, identify that a first function corresponding to the first menu item has not been used; and based on identifying that the first function has not been used, perform a second function corresponding to the second menu item, wherein the processor is configured to change the arrangement order of the plurality of menu items by placing menu items representing functions having higher degree of use at a location in the arrangement order higher than other menu items representing functions having a lower degree of use.

3. The apparatus according to claim 2, wherein the processor is configured to:

control the display to display the plurality of menu items included in the UI as an upper layer comprising a plurality of parent menu items and a lower layer comprising a plurality of child menu items corresponding to the plurality of parent menu items, respectively.

4. The apparatus according to claim 3, wherein the first input is to select a first child menu item and the second input is to select a second child menu item, and wherein the processor is configured to:

based on identifying that the first function has not been used, change the arrangement order of the plurality of menu items by placing the first child menu item to have a lower priority.

5. The apparatus according to claim 3, wherein the first input is to select a first child menu item and the second input is to select a second child menu item, and wherein the processor is configured to:

based on identifying that the first function has been used, change the arrangement order of the plurality of menu items by placing the first child menu item to have a higher priority.

6. The apparatus according to claim 2, wherein the processor is configured to display the first menu item to which a changed setting value is immediately applied in response to a setting value being changed based on the first input represented by the first menu item and identifying that the first function has been used.

7. The apparatus according to claim 2, wherein the processor is configured to change the arrangement order of the plurality of menu items based on a degree to which the first function is used with respect to a first content in response to identifying that the first function has been used with respect to the first content, and to control the display to display the changed arrangement order when the first content or second content related to the first content is provided.

8. The apparatus according to claim 7, wherein the processor is configured to identify that the first and the second contents are related to each other based on at least one of: genres, titles, sources or broadcast channels of the first and the second contents.

9. A method of controlling a display apparatus comprising:

displaying a user interface (UI) comprising a plurality of menu items, each respective menu item representing a different function to be performed by the display apparatus when the respective menu item is selected;

based on an input to select one of the plurality of menu items being received through an input receiver of the display apparatus, identifying a time during which a function corresponding to the selected menu item has been used;

based on the identified time, counting at least one of a number of times or a frequency that the function has been used; and based on the counted at least one of the number of times or the frequency, changing an arrangement order of the plurality of menu items, wherein the counting further comprises, based on the time being less than a predetermined time, excluding from counting the number of times or the frequency.

10. The method according to claim 9, further comprising:

receiving a first input to select a first menu item and sequentially receiving a second input to select a second menu item through the input receiver of the display apparatus;

based on a time between the first input and the second input being less than a predetermined time, identifying that a first function corresponding to the first menu item has not been used; and based on identifying that the first function has not been used, performing a second function corresponding to the second menu item, wherein the changing comprises changing the arrangement order of the plurality of menu items to locate menu items representing functions having a higher degree of use at a location in the arrangement order higher than other menu items representing functions having a lower degree of use.

11. The method according to claim 10, wherein the plurality of menu items in the UI are displayed as an upper layer comprising a plurality of parent menu items and a lower layer comprising a plurality of child menu items corresponding to the plurality of parent menu items, respectively.

12. The method according to claim 11, wherein the first input is to select a first child menu item and the second input is to select a second child menu item, and wherein the method further comprises:

based on identifying that the first function has not been used, changing the arrangement order of the plurality of menu items by placing the first child menu item to have a lower priority.

13. The method according to claim 11, wherein the first input is to select a first child menu item and the second input is to select a second child menu item, and wherein the method further comprises:

based on identifying that the first function has been used, changing the arrangement order of the plurality of menu items by placing the first child menu item to have a higher priority.

14. The method according to claim 10, further comprising:

displaying the first menu item to which a changed setting value is immediately applied in response to a setting value being changed based on the first input represented by the first menu item and identifying that the first function has been used.

15. The method according to claim 10, further comprising:

changing the arrangement order of the plurality of menu items based on a degree to which the first function is used with respect to a first content in response to identifying that the first function has been used with respect to the first content, and displaying the changed arrangement order on the display when the first content or second content related to the first content is provided.

16. The method according to claim 15, wherein the identifying that the first and the second contents are related to each other is based on at least one of: genres, titles, sources or broadcast channels of the first and the second contents.

* * * * *